United States Patent [19]

Kashkina et al.

[11] 3,903,269
[45] Sept. 2, 1975

[54] CHOLINOMIMETIC COMPOSITIONS CONTAINING A POLYMER DERIVATIVE OF 1-METHYL-5-[5-OXO-4-ETHYL-TETRAHYDROFURYL-(3)-METHYL]-IMIDAZOLE WITH CELLULOSE GLYCOLIC ACID

[76] Inventors: Nadezhda Alexandrovna Kashkina, ulitsa Talsu, 99/II, kv. 22; Milda Yanovna Pormale, ulitsa Suvorova, 104, kv. 10; Arvid Yanovich Kalninch, ulitsa Sverdlova, 8, kv. 3; Yanis Shusters, ulitsa Kveles, 15, korpus 4, kv. 30; Guna Robertowna Dambite, ulitsa Gorkogo, 37, kv. 20; Ipatiya Marcewna Reinberg, ulitsa Pumpura, 5, kv. 8; Idea Wladimirowna Walkowa, ulitsa Mersroga, 7, kv. 2; Wiya Aleksandrowna Tipaine, ulitsa Juglas, 53, kv. 10; Antons Petrowich Skutelis, ulitsa Marupes, 17, kv. 32; Stanislaws Kazimirowich Yankowskis, ulitsa Marupes, 17, kv. 32; Inese Petrowna Olina, ulitsa Lachplesha, 36, kv. 21, all of Riga, U.S.S.R.

[22] Filed: Jan. 8, 1974

[21] Appl. No.: 431,620

Related U.S. Application Data

[60] Division of Ser. No. 265,693, June 23, 1972, Pat. No. 3,812,099, which is a continuation of Ser. No. 68,009, Aug. 28, 1970, abandoned.

[30] Foreign Application Priority Data

Nov. 11, 1969 U.S.S.R............................. 1375103

[52] U.S. Cl. ............................................. 424/180
[51] Int. Cl............................................ A61k 27/00
[58] Field of Search............................... 424/78, 180

[56] References Cited
UNITED STATES PATENTS 2,772,999  12/1956  Masci et al. ........................ 260/231
3,214,341  10/1965  Feinstone............................ 260/231
3,277,079  10/1966  Press................................... 260/232

OTHER PUBLICATIONS

Goodman et al., The Pharmacological Basis of Therapeutics, 1966 pp. 473-475.

Primary Examiner—Albert T. Meyers
Assistant Examiner—Norman A. Drezin
Attorney, Agent, or Firm—Holman & Stern

[57] ABSTRACT

The present invention relates to a new compound which is a polymer derivative of 1-methyl-5-[5-oxo-4-ethyl-tetrahydrofuryl-(3)-methyl]-imidazole with cellulose glycolic acid of the general formula

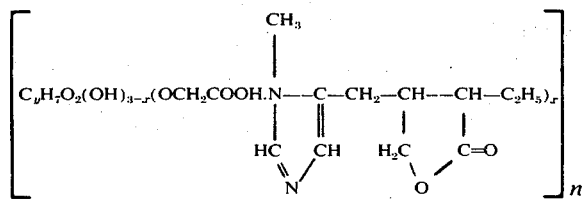

where $x$ is degree of substitution from 75 to 100, $n$ is the degree of polymerization of from 30 to 120.

The method of the invention for producing said polymer derivative of 1-methyl-5-[5-oxo-4-ethyl-tetrahydrofuryl-(3)-methyl]-imidazole with cellulose glycolic acid consists in that 1-methyl-5-[5-oxo-4-ethyl-tetrahydrofuryl-(3)-methyl]-imidazole is reacted with cellulose glycolic acid in an aqueous medium, and the desired product is subsequently isolated.

Said compound is an active principle of a medicinal preparation featuring cholinomimetic action.

6 Claims, No Drawings

CHOLINOMIMETIC COMPOSITIONS CONTAINING A POLYMER DERIVATIVE OF 1-METHYL-5-[5-OXO-4-ETHYL-TETRAHYDROFURYL-(3)-METHYL]-IMIDAZOLE WITH CELLULOSE GLYCOLIC ACID

This is a divisional of application Ser. No. 265,693, filed June 23, 1972, now U.S. Pat. No. 3,812,099, which in turn is a continuation of Ser. No. 68,009, filed Aug. 28, 1970, now abandoned.

The present invention relates to a new compound which is a polymer derivative of 1-methyl-5-[5-oxo-4-ethyl-tetrahydrofuryl-(3)-methyl]-imidazole and cellulose glycolic acid, and also to a method of producing and to the application thereof.

Said new compound, according to the invention, has the following general formula:

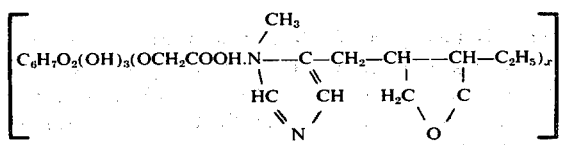

where $x$ is the degree of substitution from 75 to 100, and is the degree of polymerization from 30 to 120.

The compound proposed herein is an amorphous substance, slighly yellow in colour, hygroscopic, readily soluble in water, insoluble in organic solvents, and decomposing under the action of alkali.

Said compound features cholinomimetic action and is an active principle of a medicinal preparation.

The medicinal preparation with cholinomimetic action, according to the invention, comprises said active principle in combination with a diluent or an ointment base.

The mechanism of action of said medicinal preparation does not differ from that of pilocarpine hydrochloride, but the present medicinal preparation is noted for its greater activity and prolonged action. The cholinomimetic activity of the present preparation was compared with that of pilocarpine hydrochloride by testing 5–10 different concentrations ($3.10_{5.3.10}$ mmol./lit. – $5.3.10^{-6}$ mmol./lit.) of solutions of said preparations on the M. rectus of the frog.

The exposure time for each of the test concentrations was 2 minutes, after which the muscle was washed to its initial tonus.

The experiments have shown the contraction to be always stronger (by as much as 1.5 times) with the present preparation, as compared to pilocarpine, in the case of applying both preparations in the same concentrations to the same muscle.

Comparative tests of the cholinomimetic activity and duration of the action of the proposed preparation and pilocarpine hydrochloride were carried out on white rabbits. The animals were treated with solutions of both preparations in concentrations of from 0.0625 to 2 wt.%, by instillation. The myosis phenomena observed with white rabbits at various concentrations of the instilled preparations indicated the activity and duration of action of the present preparation to be 1.5–3 times greater than those of pilocarpine hydrochloride.

The present preparation was studied for acute toxicity on 102 white mice, both male and female, by intra-abdominal injection of from 1–3% solutions of pilocarpine hydrochloride and of the present preparation in doses of 100–600 mg/kg. Each dose was administered to a group of animals comprising from 6–12 individuals.

The external clinical picture of the acute intoxication revealed no essential difference between the present preparation and pilocarpine.

The preparation proposed herein finds application, mainly, in ophthalmiatrics for treating primary glaucoma, but is can also be used for treating adynamic ileus.

Said preparation was clinically tested on 48 patients suffering from primary glaucoma, both, hospitalized and ambulatory. The patients treated with the present preparation were those who had already passed through the course of treatment with pilocarpine, physostigmine, phosphacol, tosmilene, etc., but with insufficient results. A 1–2% solution of the present preparation was instilled to the patients 3–4 times a day. The administration of the preparation resulted in a reduction of the intraocular tension and in the stabilization thereof. In one third of the cases the therapeutic effect was complete, in another third it was partial. No side effects were observed, even when the present preparation was applied over a long period of time (more than a year).

Said preparation is used in the form of aqueous solutions and ointments. According to the invention, doubly distilled water is used as a diluent. The content of the active principle in the aqueous solutions of the preparation is from 1.1–2.3 wt.%.

In ointments aqueous lanolin, and petroleum are employed as a base therefor, or carboxymethyl cellulose is used as a polymeric base. The content of the active principle in said ointments is from 1.1 – 4.6 wt.%.

The preparation is contraindicated for cataract in combination with glaucoma.

The method of producing said compound, i.e., a polymer derivative of 1-methyl-5-[5-oxo-4-ethyl-tetrahydrofuryl-(3)-methyl]-imidazole and cellulose glycolic acid, according to the invention, consists in reacting 1-methyl-5-[5-oxo-4-ethyl-tetrahydrofuryl-(3)-methyl]-imidazole with cellulose glycolic acid in an aqueous medium, followed by the isolation of the desired product.

In order to enhance the quality of the final product, the starting materials, that is, the 1-methyl-5-[5-oxo-4-ethyl-tetrahydrofuryl-(3)-methyl]-imidazole and the cellulose glycolic acid, are taken in equimolecular amounts.

In order to accelerate the reactions, the cellulose glycolic acid is used in the form of an aqueous solution, obtained by passing an aqueous solution of a sodium salt of cellulose glycolic acid through an H-form cation exchange resin.

The proposed method is effected as follows.

The cellulose glycolic acid starting material is used either dry, or as an aqueous solution. The use of cellulose glycolic acid in the form of an aqueous solution reduces the reaction time by as much as 5–6 times. The cellulose glycolic acid is reacted with 1-methyl-5-[5-oxo-4-ethyl-tetrahydrofuryl-(3)-methyl]-imidazole in an aqueous medium.

The reaction of the combination of cellulose glycolic acid with 1-methyl-5-[5-oxo-4-ethyl-tetrahydrofuryl-(3)-methyl]-imidazole is polymer-analogous; the degree of polymerization of the cellulose glycolic acid does not change. The process of interaction is carried out under intense stirring at room temperature. The end of the reaction is checked by measuring the pH of the reaction medium (which should be within 6.8–7.2).

Upon completion of the process, the desired product is isolated either by precipitating it in acetone or ethanol, or by lyophilic drying of the resulting solution. The yield of the desired product is 95–98 wt.%.

For a better understanding of the present invention, given hereinbelow are examples illustrating the way in which the present method of producing said compound can be realized.

EXAMPLE 1

10 g of cellulose glycolic acid (degree of substitution 75 and degree of polymerization 80) are mixed with 100 ml of water, and with 7.6 g of 1-methyl-5-[5-oxo-4-ethyl-tetrahydrofuryl-(3)-methyl]-imidazole being added thereinto. The mixture is stirred for 4 hours at room temperature. The pH of the solution is 6.9. The solution obtained is filtered and lyophilically dried. The yield of the desired product is 16.9 g (96% of the theoretical amount).

Calctd., %: N, 5.79; 1-methyl-5-[5-oxo-4-ethyl-tetrahydrofuryl-(3)-methyl]-imidazole, 43.2; Found, %: N, 5.70; 1-methyl-5-[5-oxo-4-ethyl-tetrahydrofuryl-(3)-methyl]-imidazole, 42.8.

EXAMPLE 2

10 g of a sodium salt of cellulose glycolic acid (degree of substitution 80 and degree of polymerization 80) are dissolved in 200 ml of water, and the resulting solution is passed through an H-form cation exchange resin (the volume capacity being 4.5–5 mg-equiv./g). A solution of the cellulose glycolic acid is thus obtained containing 4.5 wt.% of cellulose glycolic acid. 100 ml of the obtained solution are combined with 3.6 g of 1-methyl-5-[5-oxo-4-ethyl-tetrahydrofuryl-(3)-methyl]-imidazole. The process is carried out under stirring, at room temperature for 0.5 hr. The pH of the solution is 7.0. The resulting solution is lyophilically dried. The yield of the desired product is 7.9 g (97 wt.% of the theoretical amount).

Calctd., %: N, 5.92; 1-methyl-5-[5-oxo-4-ethyl-tetrahydrofuryl-(3)-methyl]-imidazole, 44.4; Found, %: N, 5.8; 1-methyl-5-[5-oxo-4-ethyl-tetrahydrofuryl-(3)-methyl]-imidazole, 43.8.

What is claimed is:

1. A composition having cholinomimetic activity comprising a cholinomimetically-effective amount of a polymer having the general formula:

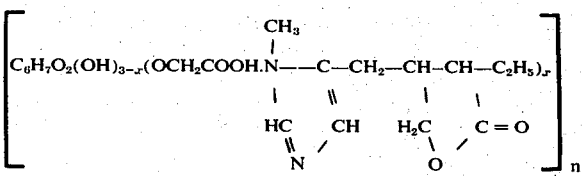

where $x$ is the degree of substitution from 75 to 100 and $n$ is the degree of polymerization of from 30 to 120, prepared by reacting 1-methyl-5-[5-oxo-4-ethyl-tetrahydrofuryl-(3)-methyl]-imidizole and cellulose glycolic acid in admixture with a pharmaceutically acceptable carrier.

2. A composition as claimed in claim 1, wherein said carrier is distilled water.

3. A composition as claimed in claim 2 wherein said polymer is present in an amount of from 1.1 to 2.3% by weight.

4. A composition as claimed in claim 1 wherein said carrier is an ointment base.

5. A composition as claimed in claim 4 wherein said ointment base comprises a member of the group consisting of aqueous lanolin, petroleum jelly, and carboxmethylcellulose.

6. A composition as claimed in claim 4 wherein said polymer is present in an amount of from 1.1 to 4.6% by weight.

* * * * *